(12) United States Patent
Okuda et al.

(10) Patent No.: US 10,897,043 B2
(45) Date of Patent: Jan. 19, 2021

(54) SECONDARY BATTERY

(71) Applicant: KABUSHIKI KAISHA TOYOTA CHUO KENKYUSHO, Nagakute (JP)

(72) Inventors: Chikaaki Okuda, Nagakute (JP); Hiroki Kondo, Nagakute (JP); Tsuyoshi Sasaki, Nagakute (JP)

(73) Assignee: KABUSHIKI KAISHA TOYOTA CHUO KENKYUSHO, Nagoya (JP)

( * ) Notice: Subject to any disclaimer, the term of this patent is extended or adjusted under 35 U.S.C. 154(b) by 87 days.

(21) Appl. No.: 16/333,799

(22) PCT Filed: Oct. 20, 2017

(86) PCT No.: PCT/JP2017/038060
§ 371 (c)(1),
(2) Date: Mar. 15, 2019

(87) PCT Pub. No.: WO2018/079452
PCT Pub. Date: May 3, 2018

(65) Prior Publication Data
US 2019/0221840 A1 Jul. 18, 2019

(30) Foreign Application Priority Data
Oct. 27, 2016 (JP) ................................. 2016-210562

(51) Int. Cl.
*H01M 10/0566* (2010.01)
*H01M 10/0525* (2010.01)
(Continued)

(52) U.S. Cl.
CPC ............. *H01M 4/368* (2013.01); *H01M 2/16* (2013.01); *H01M 4/13* (2013.01); *H01M 4/131* (2013.01);
(Continued)

(58) Field of Classification Search
None
See application file for complete search history.

(56) References Cited

U.S. PATENT DOCUMENTS

2008/0003497 A1* 1/2008 Suzuki .................... H01M 2/34
429/129
2008/0081257 A1 4/2008 Yoshida et al.
(Continued)

FOREIGN PATENT DOCUMENTS

JP H11-238524 A 8/1999
JP 2001-243975 A 9/2001
(Continued)

OTHER PUBLICATIONS

JP-2005302427-A English machine translation (Year: 2005).*
(Continued)

*Primary Examiner* — Scott J. Chmielecki
(74) *Attorney, Agent, or Firm* — Oliff PLC

(57) ABSTRACT

A secondary battery includes a first electrode; a first active material fluid which is electrically connected to the first electrode, contains a first active material and a supporting salt, and is flowable; and a second electrode including a structure which is formed by containing a second active material, the structure either being immersed in the first active material fluid or holding the first active material fluid, and a separating membrane disposed between the first active material fluid and the structure, the separating membrane having ion conducting properties and insulating properties.

10 Claims, 3 Drawing Sheets

(51) Int. Cl.
    *H01M 10/058*     (2010.01)
    *H01M 4/36*     (2006.01)
    *H01M 2/16*     (2006.01)
    *H01M 4/131*     (2010.01)
    *H01M 4/75*     (2006.01)
    *H01M 4/13*     (2010.01)
    *H01M 4/505*     (2010.01)
    *H01M 4/525*     (2010.01)

(52) U.S. Cl.
    CPC .......... *H01M 4/75* (2013.01); *H01M 10/058* (2013.01); *H01M 10/0525* (2013.01); *H01M 10/0566* (2013.01); *H01M 2/1653* (2013.01); *H01M 4/505* (2013.01); *H01M 4/525* (2013.01); *H01M 2300/004* (2013.01)

(56) References Cited

U.S. PATENT DOCUMENTS

| | | |
|---|---|---|
| 2009/0017380 A1 | 1/2009 | Honda et al. |
| 2009/0142656 A1 | 6/2009 | Nathan et al. |
| 2011/0086249 A1* | 4/2011 | Timmons .......... H01M 10/0562 429/49 |
| 2012/0208051 A1 | 8/2012 | Tsukiji et al. |
| 2013/0189602 A1 | 7/2013 | Lahiri et al. |
| 2014/0193701 A1 | 7/2014 | Kanemoto et al. |
| 2018/0026263 A1* | 1/2018 | Mayousse ............ H01M 4/582 429/94 |
| 2019/0115609 A1* | 4/2019 | Phillips ............ H01M 8/04552 |

FOREIGN PATENT DOCUMENTS

| | | | | |
|---|---|---|---|---|
| JP | 2001-243984 A | | 9/2001 | |
| JP | 2002-222653 A | | 8/2002 | |
| JP | 2005-093276 A | | 4/2005 | |
| JP | 2005302427 A | * | 10/2005 | .............. H01M 2/30 |
| JP | 2008-505434 A | | 2/2008 | |
| JP | 2008-078119 A | | 4/2008 | |
| JP | 2014-229544 A | | 12/2014 | |
| JP | 2015-041433 A | | 3/2015 | |
| JP | 2015-511369 A | | 4/2015 | |
| WO | 2006/080265 A1 | | 8/2006 | |
| WO | 2012/042743 A1 | | 4/2012 | |
| WO | 2013/018563 A1 | | 2/2013 | |

OTHER PUBLICATIONS

"Development of all-solid-state secondary battery." Science & Technology Co., Ltd, pp. 114-119.

Oct. 16, 2018 Office Action issued in Japanese Patent Application No. 2016-210562.

Apr. 30, 2019 International Preliminary Report on Patentability issued in International Patent Application No. PCT/JP2017/038060.

Jan. 9, 2018 International Search Report issued in International Patent Application No. PCT/JP2017/038060.

* cited by examiner

SECONDARY BATTERY

TECHNICAL FIELD

The present description discloses a secondary battery.

BACKGROUND ART

As a secondary battery, hitherto, for example, a lithium secondary battery has been proposed in which a mixture containing a Positive electrode active material is formed into a positive electrode current collector, a mixture containing a negative electrode active material is formed into a negative electrode current collector, and the current collectors are wound with a separator containing an electrolyte interposed therebetween (e.g., refer to Patent Literature 1). In this secondary battery, by regulating the movement of the electrolyte in the in-plane direction, deterioration in battery characteristics is further suppressed. In recent years, it has been desired to increase the capacity of secondary batteries. In order to increase the battery capacity, it is necessary to increase the thickness of an active material layer. When the thickness of an electrode is increased in such a manner, the flow path of the electrolyte in the thickness direction becomes longer, and it becomes unlikely to relieve the concentration gradient of the electrolyte in the thickness direction. Furthermore, as such a secondary battery, for examples, a secondary battery having a configuration in which needle-point holder-shaped positive and negative electrodes are stacked together with an electrolyte interposed therebetween has been proposed (e.g., refer to Non-Patent Literature 1).

CITATION LIST

Patent Literature

PTL 1: Japanese Unexamined Patent Application Publication No. 2014-229544

Non-Patent Literature

NPL 1: Development of all-solid-state secondary battery (Science & Technology Co., Ltd.), pp. 114-119

SUMMARY OF INVENTION

Technical Problem

However, in the lithium secondary battery according to Patent Literature 1, although diffusion of the electrolyte in the electrode plane direction is taken into consideration, diffusion in the thickness direction (depth direction) is not taken into consideration. Furthermore, in the lithium secondary battery according to Non-Patent Literature 1, although a novel configuration is proposed, there are many problems in terms of production, and the configuration has not been realized yet. Therefore, it has been demanded to further improve battery characteristics, for example, to further increase the battery capacity.

The present disclosure has been made in view of such problems, and it is a main object of the disclosure to provide a novel secondary battery capable of further improving battery characteristics.

Solution to Problem

The present inventors have performed thorough studies in order to achieve the above-mentioned object, and have found that, by employing a novel electrode structure in which the distance of movement of carrier ions is shortened as much as possible while allowing the distance of electron transfer to lengthen, battery characteristics can be further improved, thus leading to completion of a secondary battery disclosed in the present description.

That is, a secondary battery disclosed in the present description includes a first electrode; a first active material fluid which is electrically connected to the first electrode, contains a first active material and a supporting salt, and is flowable; and a second electrode including a structure which is formed by containing a second active material, the structure either being immersed in the first active material fluid or holding the first active material fluid, and a separating membrane disposed between the first active material fluid and the structure, the separating membrane having ion conducting properties and insulating properties.

Advantageous Effects of Invention

In this secondary battery, it is possible to provide a novel secondary battery capable of further improving battery characteristics. In the secondary battery, since the second electrode containing the second active material and the first active material fluid containing the first active material are arranged at a close distance from each other with the separating membrane interposed therebetween, even though the ion conductivity and ion transport number are low, higher battery characteristics can be exhibited. Furthermore, since the first active material flows in a state of being contained in a fluid, the advantageous effects can be obtained regardless of the thickness of the electrode. In an existing layered electrode (refer to FIG. 4), when the thickness of each of active material layers is increased, because of the low ion transport number of the nonaqueous electrolyte and the like, the salt concentration may vary in the depth direction in some cases. In accordance with the secondary battery disclosed in the present description, such a problem in the salt concentration and the like can be solved. As a result, it is assumed that it is possible to obtain advantageous effects, such as improvement in durability and suppression of a decrease in battery capacity.

DESCRIPTION OF EMBODIMENTS

Figure 1:
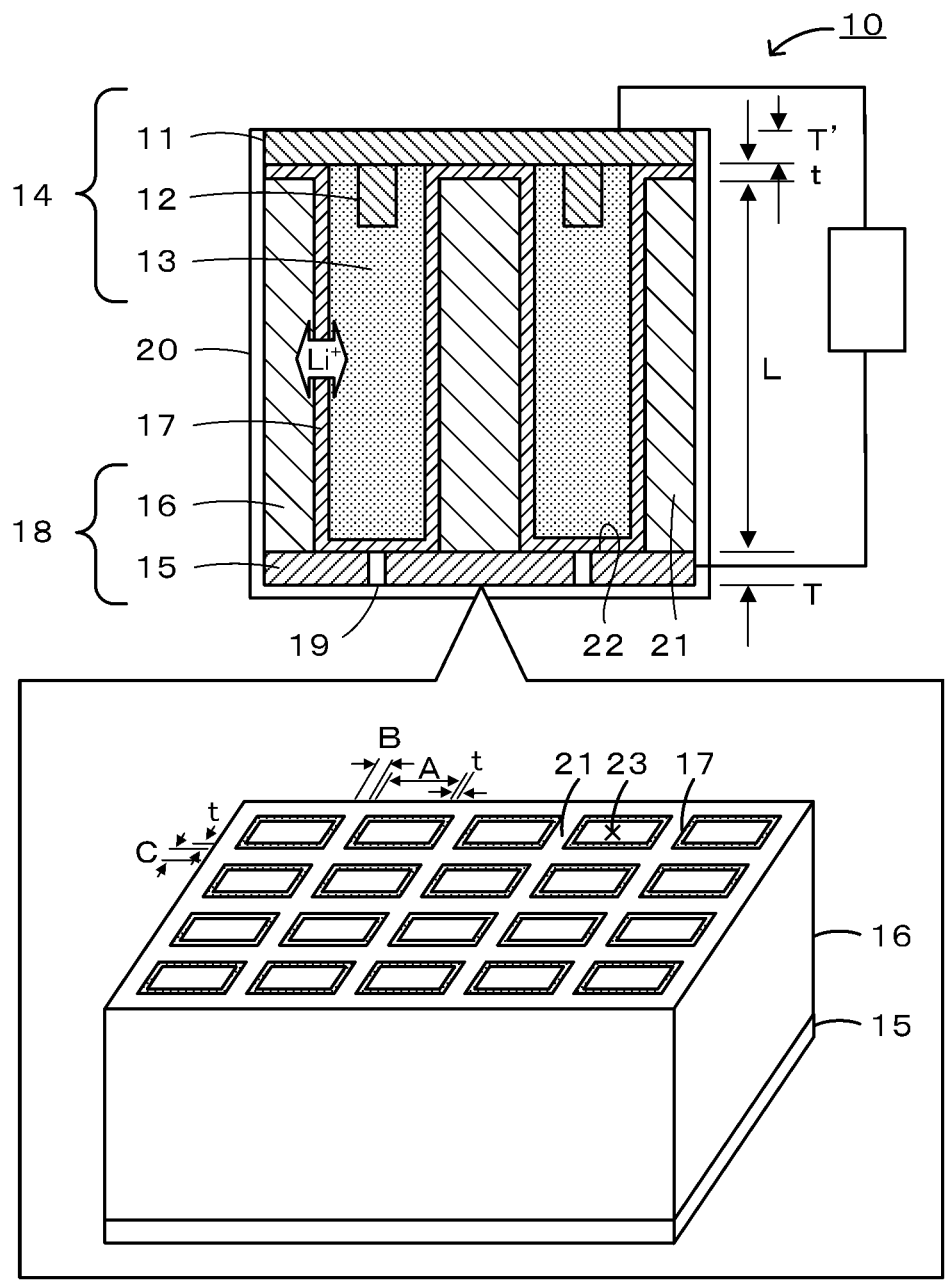
FIG. 1 is a schematic diagram showing an example of a secondary battery 10.

Secondary batteries disclosed in embodiments will be described below with reference to the drawings. FIG. 1 is a schematic diagram showing an example of a secondary battery 10. The secondary battery 10 includes a first electrode 14, a first active material fluid 13, and a second electrode 18. The secondary battery 10 may be configured such that the first electrode 14 is a positive electrode, the first active material fluid 13 contains a positive electrode active material, as a first active material, and a conductive material, and the second electrode 18 is a negative electrode. Alternatively, the secondary battery 10 may be configured such that the first electrode 14 is a negative electrode, the first active material fluid 13 contains a negative electrode active material as a first active material, the second electrode 18 is a positive electrode, and further a conductive material is contained. Here, for convenience of explanation, a lithium secondary battery in which the first electrode 14 is a positive electrode, the second electrode 18 is a negative electrode, and lithium ions are used as carriers will be described as a principal example.

The first electrode 14 includes a first current collector 11, collector terminals 12, and a first active material fluid 13. The first current collector 11 is formed of a material having conductivity. Examples of the material that can be used as the first current collector 11 include carbon paper, aluminum, copper, titanium, stainless steel, nickel, iron, platinum, baked carbon, conductive polymers, and conductive glass, and also include aluminum, copper, or the like whose surface is treated with carbon, nickel, titanium, silver, platinum, gold, or the like for the purpose of improving adhesion properties, conductivity, and oxidation (reduction) resistance. Examples of the shape of the current collector include a foil shape, a film shape, a sheet shape, a net shape, a punched or expanded shape, a lath body, a porous body, a foam, and a formed body of fibers. The thickness T' of the first current collector 11 may be, for example, 500 µm to 1 cm. The first current collector 11 has collector terminals 12, which are to be inserted into openings of bottomed holes 23, on the lower surface side thereof. The collector terminal 12 may be formed of any material that has conductivity and may be formed of the same material as, or a different material from, that of the first current collector 11.

The first active material fluid 13 is a flowable fluid which is electrically connected to the first electrode 14 and contains a first active material and a supporting salt. The first active material is a solid active material, and the first active material fluid 13 may be a slurry containing an electrolyte. The first active material fluid 13 may further contain a conductive material. The first active material may be, for example, a compound containing lithium and a transition metal, such as an oxide containing lithium and a transition metal element or a phosphate compound containing lithium and a transition metal element. Specific examples thereof that can be used include a lithium-manganese composite oxide expressed by $Li_{(1-x)}MnO_2$ ($0<x<1$, hereinafter the same), $Li_{(1-x)}Mn_2O_4$, or the like as a basic composition formula; a lithium-cobalt composite oxide expressed by $Li_{(1-x)}CoO_2$ or the like as a basic composition formula; a lithium-nickel composite oxide expressed by $Li_{(1-x)}NiO_2$ or the like as a basic composition formula; a lithium-cobalt-nickel-manganese composite oxide expressed by $Li_{(1-x)}Co_aNi_bMn_cO_2$ ($a>0$, $b>0$, $c>0$, $a+b+c=1$) as a basic composition formula; a lithium-vanadium composite oxide expressed by $LiV_2O_3$ or the like as a basic composition formula; and a transition metal oxide expressed by $V_2O_5$ or the like as a basic composition formula. Furthermore, a lithium iron phosphate compound expressed by $LiFePO_4$ as a basic composition formula can be used as a positive electrode active material. Among these, a lithium-cobalt-nickel-manganese composite oxide, such as $LiCo_{1/3}Ni_{1/3}Mn_{1/3}O_2$ or $LiNi_{0.4}Co_{0.3}Mn_{0.3}O_2$, is preferable. The term "basic composition formula" means that it may contain other elements, such as Al and Mg. The average particle size of the first active material is, for example, preferably within a range of 0.1 to 50 µm, and more preferably within a range of 1 to 20 µm. Within such a range, good flowability can be obtained. The amount of addition of the first active material is preferably within a range of 30% to 75% by volume, and more preferably within a range of 60% to 70% by volume, relative to the total volume of the first active material fluid 13. Within such a range, good battery capacity can be obtained. In this description, the average particle size of a powder, such as the active material, is defined as a value obtained by observing the powder with an electron microscope (SEM), measuring diameters of powder particles included in the observation image, and averaging the measured values.

The conductive material is not particularly limited as long as it is an electron conducting material that does not adversely affect battery performance. For example, one or a mixture of two or more selected from graphites, such as natural graphite (flake graphite, scaly graphite) and artificial graphite, acetylene black, carbon black, ketjen black, carbon whiskers, needle coke, carbon fiber, and metals (copper, nickel, aluminum, silver, gold, etc.) can be used. Among these, as the conductive material, carbon black and acetylene black are preferable. The average particle size of the conductive material is, for example, preferably within a range of 0.02 to 0.2 µm, and more preferably within a range of 0.05 to 0.1 µm. Within such a range, good flowability can be obtained. The amount of addition of the conductive material is preferably within a range of 5% to 30% by volume, and more preferably within a range of 10% to 20% by volume, relative to the total volume of the first active material fluid 13. Within such a range, a decrease in battery capacity can be suppressed, and sufficient conductivity can be provided.

As a solvent of the electrolyte contained in the first active material fluid 13, for example, a solvent of a nonaqueous electrolyte or the like may be used. Examples of the solvent include carbonates, esters, ethers, nitriles, furans, sulfolanes, and dioxolanes, and these may be used alone or in a mixture of two or more. Specific examples thereof include, as carbonates, cyclic carbonates, such as ethylene carbonate, propylene carbonate, vinylene carbonate, butylene carbonate, and chloroethylene carbonate, and chain carbonates, such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate; cyclic esters, such as γ-butyrolactone and rvalerolactone; chain esters, such as methyl formate, methyl acetate, ethyl acetate, and methyl butyrate; ethers, such as dimethoxyethane, ethoxymethoxy ethane, and diethoxyethane; nitriles, such as acetonitrile and benzonitrile; furans, such as tetrahydrofuran and methyltetrahydrofuran; sulfolanes, such as sulfolane and tetramethyl sulfolane; and dioxolanes, such as 1,3-dioxolane and methyldioxolane. Among these, a combination of a cyclic carbonate and a chain carbonate is preferable. By using this combination, not only excellent cycle characteristics, which indicate battery characteristics under repeated charging and discharging, can be obtained, but also it is possible to obtain well-balanced viscosity of the electrolyte, capacitance of the resulting battery, battery output, and the like.

The supporting salt in the first active material fluid 13 contains, for example, ions serving as carriers of the secondary battery 10. Examples of the supporting salt include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. Among these, use of a combination of one or two or more selected from the group consisting of inorganic salts, such as $LiPF_6$, $LiBF_4$, $LiAsF_6$, and $LiClO_4$, and organic salts, such as $LiCF_3SO_3$, $LiN(CF_3SO_2)_2$, and $LiC(CF_3SO_2)_3$, is preferable from the viewpoint of electric characteristics. The concentration of the supporting salt in the electrolyte is preferably 0.1 mol/L or more and 5 mol/L or less, and more preferably 0.5 mol/L or more and 2 mol/L or less. When the concentration of the dissolved supporting salt is 0.1 mol/L or more, a sufficient current density can be obtained, and when the concentration is 5 mol/L or less, the electrolyte can be further stabilized.

The second electrode 18 includes a second current collector 15, a structure 16, and a separating membrane 17. The second current collector 15 is formed of a material having conductivity. The second current collector 15 may be, for example, formed of any one of the materials and with any one of the shapes described for the first current collector 11. The thickness T of the second current collector 15 can be set in the same range as that for the thickness T' of the first current collector 11. Furthermore, the second electrode 18 is provided with filling holes 19 used for filling of the first active material fluid 13. The filling holes 19 may be configured to be closed after the bottomed holes 23 have been filled with the first active material fluid 13. In FIG. 1, the second current collector 15 serves as a bottom 22 of the bottomed holes 23. However, the configuration is not limited thereto. The structure 16 may have a bottom 22 provided with filling holes, and filling holes 19 in communication with the bottom 22 may be formed in the second current collector 15. The structure 16 is configured such that a plurality of bottomed holes 23 are formed by a partition 21. The structure 16 is a conductive member which is formed by containing a second active material. The structure 16 is provided with many bottomed holes 23 so that the contact area with the first active material fluid 13 can be increased. The structure 16 may be a honeycomb structure. The first active material fluid 13 is held in the bottomed holes 23. The structure 16 is provided with bottomed holes 23 having a rectangular cross section. The cross-sectional shape in a direction orthogonal to the longitudinal direction of each of the bottomed hole 23 is preferably a shape that gives a suitable volume ratio between the bottomed holes 23 and the partition 21 and is, for example, preferably polygonal, and particularly preferably rectangular, hexagonal, or the like. The length A of a side of an opening of a bottomed hole 23 is, for example, preferably within a range of 50 to 1,000 μm, and more preferably within a range of 100 to 250 μm. Furthermore, each of the thicknesses B and C of the partition 21 is, for example, preferably within a range of 20 to 200 μm, and more preferably within a range of 30 to 60 μm. Within such a range, it is possible to obtain a good balance between the first active material and the second active material. The length L in the longitudinal direction of the bottomed hole 23 may be appropriately set depending on the battery design, such as the battery capacity of the secondary battery 10.

The structure 16 is formed by containing a second active material, and in the case where the second active material does not have conductivity, for example, a conductive material having conductivity, such as a carbonaceous material, may be mixed therewith to form the structure 16. The structure 16 may be obtained, for example, by mixing a second active material, a conductive material as needed, and a binder, followed by forming. As the conductive material, the conductive materials described for the first active material fluid 13 can be used. As the second active material, for example, a material capable of intercalating/deintercalating lithium ions serving as carriers may be used. Examples of the second active material include inorganic compounds, such as lithium, lithium alloys, and tin compounds; carbonaceous materials capable of intercalating/deintercalating lithium ions; composite oxides containing a plurality of elements; and conductive polymers. Examples of carbonaceous materials include cokes, glass-like carbons, graphites, non-graphitizable carbons, pyrocarbons, and carbon fibers. Among these, graphites, such as artificial graphite and natural graphite, are preferable. Examples of composite oxides include lithium-titanium composite oxides and lithium-vanadium composite oxides. The binder plays a role of binding second active material particles and conductive material particles and maintaining a predetermined shape. Examples thereof include fluorine-containing resins, such as polytetrafluoroethylene (PTFE), polyvinylidene fluoride (PVdF), and fluororubber; thermoplastic resins, such as polypropylene and polyethylene; ethylene-propylene-diene monomer (EPDM) rubber, sulfonated EPDM rubber, and natural butyl rubber (NBR). These can be used alone or as a mixture of two or more. Furthermore, it is also possible to use an aqueous dispersion of a cellulose system or styrene-butadiene rubber (SBR), which is an aqueous binder. In the structure 16, the content of the second active material is preferably within a range of 60% to 90% by volume, and more preferably within a range of 70% to 80% by volume, relative to the total solid volume of the structure 16 (excluding the volume of the bottomed holes 23). Furthermore, the content of the conductive material is preferably within a range of 0% to 30% by volume, and more preferably within a range of 0% to 20% by volume, relative to the total solid volume of the structure 16. Furthermore, the content of the binder is preferably within a range of 0.1% to 5% by volume, and more preferably within a range of 0.2% to 1% by volume, relative to the total solid volume of the structure 16.

In the structure 16 of the second electrode, a separating membrane 17 having ion conducting properties and insulating properties is disposed between the first active material fluid 13 and the structure 16. The separating membrane 17 conducts lithium ions serving as carriers. Furthermore, the separating membrane 17 is disposed entirely between the first active material fluid 13 and the second current collector 15 and entirely between the first active material fluid 13 and the structure 16, thus preventing short-circuiting between the first electrode 14 and the second electrode 18. The separating membrane 17 is suitably made of a polymer having ion conducting properties and insulating properties. The separating membrane 17 is, for example, made of a copolymer of polyvinylidene fluoride (PVdF) and hexafluoropropylene (HFP), polymethyl methacrylate (PMMA), or a copolymer of PMMA and an acrylic polymer. For example, in the case of a copolymer of PVdF and HFP, part of the electrolyte causes the membrane to swell and gelate, thereby forming an ion conductive membrane. The thickness t of the separating membrane 17 is, for example, preferably 0.5 μm or more, more preferably 2 μm or more, and may be 5 μm or more. The thickness t of 0.5 μm or more is preferable from the standpoint of securing insulating properties. Furthermore, the thickness t of the separating membrane 17 is preferably 20 μm or less, and more preferably 10 μm or less. The thickness t of 20 μm or less is preferable from the standpoint of suppressing a decrease in ion conducting properties. Within such a range, good ion conducting properties and insulating properties can be obtained. The separating membrane 17 may be formed, for example, by immersing the structure 16 in a solution containing raw materials, or by supplying a solution containing raw materials into the bottomed holes 23 and disposing the raw materials on the surfaces of the bottomed holes 23, followed by polymerization.

A battery case 20 is a member that holds the first electrode 14, the structure 16, and the like. Any material may be used for the battery case 20 as long as it prevents the first electrode 14 and the second electrode 18 from being short-circuited with each other and has enough strength to protect the structure 16 and the like. For example, an insulating resin may be used. The shape of the secondary battery 10 is not particularly limited, but for example, may be a coin shape, button shape, sheet shape, stack shape, cylindrical shape, flat shape, rectangular shape, or the like.

Figure 4:
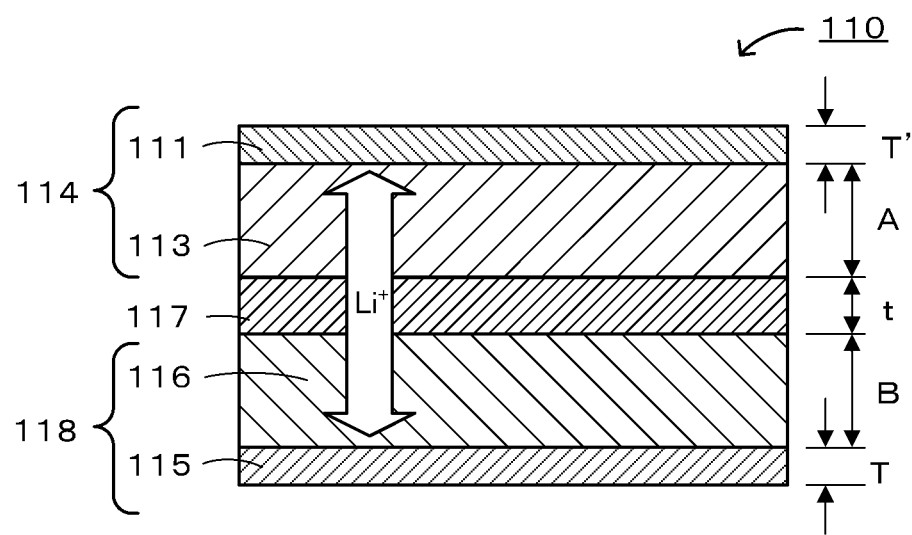
FIG. 4 is a schematic diagram showing an example of a secondary battery 110 including an existing layered electrode.

In the secondary battery 10 described in detail above, since the second electrode 18 containing the second active material and the first active material fluid 13 containing the first active material are arranged at a close distance from each other with the separating membrane 17 interposed therebetween, even when the ion conductivity and ion transport number are low, the distance of movement of ions serving as carriers is shortened and higher battery characteristics can be exhibited. Furthermore, since the first active material flows in a state of being contained in a fluid, the advantageous effects described above can be obtained regardless of the thickness of the electrode. FIG. 4 is a schematic diagram showing an example of a secondary battery 110 including an existing layered electrode. The secondary battery 110 includes a first electrode 114 having a first current collector 111 and a first active material layer 113, a second electrode 118 having a second current collector 115 and a second active material layer 116, and a separator 117 disposed between the first electrode 114 and the second electrode 118. In such a secondary battery 110, when the thickness of each of the first active material layer 113 and the second active material layer 116 is increased, because of an increase in the distance of movement of carrier ions (refer to solid white arrows), the low ion transport number of the nonaqueous electrolyte, and the like, the salt concentration may vary in the depth direction in some cases. In contrast, in the secondary battery 10, since the first active material and the second active material are arranged at a close distance from each other, the amount of unevenness in salt concentration in the thickness direction of the electrode is small, and quick charging can be performed. Furthermore, even in the case of an electrolyte having low ion conductivity, a high output can be produced. Moreover, the amount of in-plane unevenness in concentration which can be caused by liquid flow in the electrode plane direction is small, and durability can be improved. Since the active materials in large amounts as much as possible can be made to contribute to battery reactions, the battery capacity can be further increased, and since deposition of metallic lithium and the like can be suppressed, safety is also improved. Furthermore, since ultra-thick-film electrodes can be used, the energy density can be further increased. Moreover, since it is not necessary to apply an electrode mixture to a current collector, process costs can be further reduced.

It is to be understood that the present disclosure is not limited to the embodiment described above, and various modifications to the embodiment are possible within the technical scope of the present disclosure.

Figure 2:
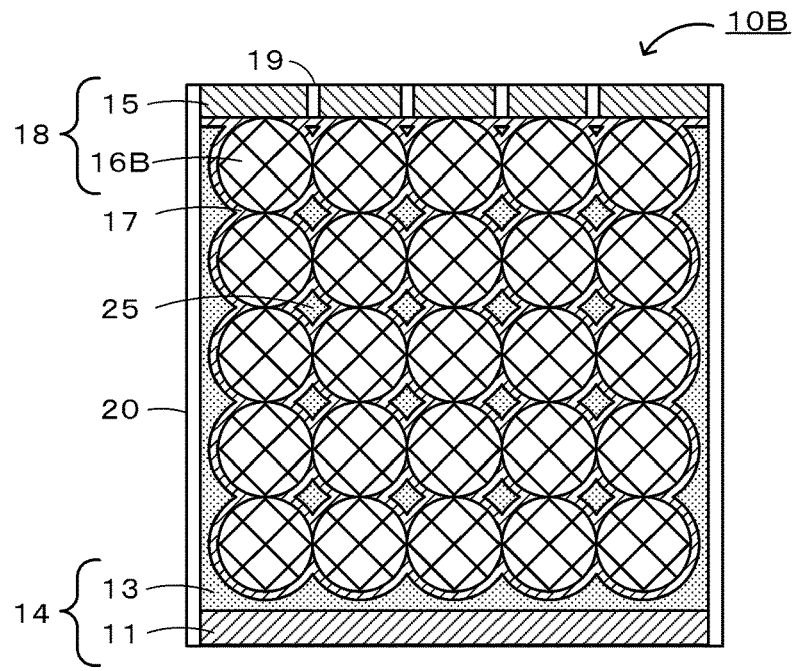
FIG. 2 is a schematic diagram showing an example of a secondary battery 10B.

For example, in the above-described embodiment, the structure 16 in which bottomed holes 23 are formed by the partition 21 is used. However, the present disclosure is not limited thereto as long as the contact area with the first active material fluid 13 can be increased. FIG. 2 is a schematic diagram showing an example of a secondary battery 10B. The secondary battery 10B is configured such that a second electrode 18 includes a structure 16B which is formed into a predetermined shape in a state where second active material portions are electrically connected to one another, and the structure 16B is immersed in a first active material fluid 13. The structure 16B has a network structure in which second active material portions are electrically connected to one another. The structure 16B is immersed in the first active material fluid 13. A space 25 is formed between adjacent second active material portions, and the inside of the space 25 is also filled with the first active material fluid 13. Furthermore, a separating membrane 17 is disposed entirely between the first active material fluid 13 and the structure 16B and entirely between the first active material fluid 13 and a second current collector 15. In the secondary battery 10B having such a configuration, the distance of movement of ions can be further shortened, and the same advantageous effects as those of the secondary battery 10 described above can be obtained.

Figure 3:
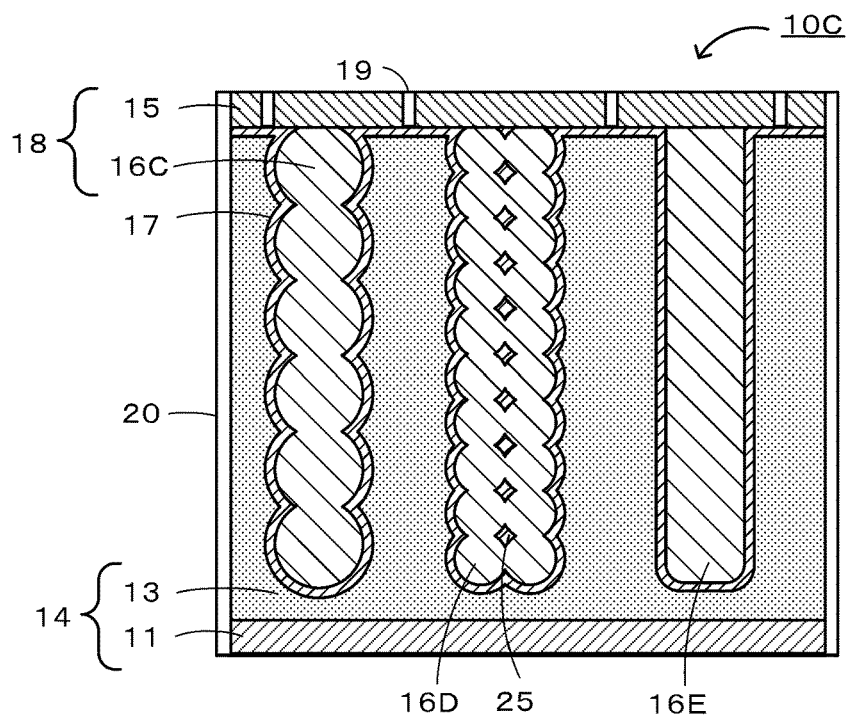
FIG. 3 is a schematic diagram showing an example of a secondary battery 10C.

Alternatively, structures 16C, 16D, and 16E shown in a secondary battery 10C may be provided. FIG. 3 is a schematic diagram showing an example of a secondary battery 10C. The secondary battery 10C includes a columnar structure 16C in which second active material particles are stacked together, a structure 16D in which second active material particles are stacked together with spaces 25 therebetween, a structure 16E formed into a columnar shape, and the like. Note that the secondary battery 10 may have any one or two or more of the structures 16C to 16E. In the secondary battery 10C having such a configuration, the distance of movement of ions can be further shortened, and the same advantageous effects as those of the secondary battery 10 described above can be obtained.

In the secondary battery 10 described above, the first electrode 14 is a positive electrode, and the second electrode 18 is a negative electrode. However, the configuration is not limited thereto. The first electrode 14 may be a negative electrode, and the second electrode 18 may be a positive electrode. Furthermore, in the embodiment described above, lithium ions are selected as carriers of the secondary battery 10. However, the carriers are not limited thereto, and may be selected from alkali ions, such as sodium ions and potassium ions, and group II element ions, such as calcium ions and magnesium ions. Furthermore, although a nonaqueous electrolyte is used as the electrolyte, an aqueous electrolyte may be used.

EXAMPLES

Examples in which the above-described secondary battery was specifically fabricated will be described.

Examples 1 to 3, Comparative Example 1

Regarding secondary batteries having the configurations shown in FIGS. 1 and 4, the energy density and the facing area were obtained by calculations. By using the lengths and thicknesses of the individual elements shown in FIGS. 1 and 4, the energy density per volume and the facing area per 1 $m^3$ were calculated. As a result, as shown in Table 1, in Examples 1 to 3, each having the structure shown in FIG. 1, the Energy density equivalent to that of Comparative Example 1 is exhibited, and the facing area 1.5 times or more, or about 3 times larger than that of Comparative Example 1 is exhibited. Accordingly, in Examples 1 to 3, it was anticipated that lithium reactivity would be high, and unevenness in lithium ion concentration and the like would be unlikely to occur.

TABLE 1

|  | Example 1 | Example 2 | Example 3 | Comparative Example 1 |
|---|---|---|---|---|
| A (μm) | 100 | 100 | 200 | 81 |
| B (μm) | 54 | 54 | 117 | 106 |
| C (μm) | 55 | 55 | 116 | — |
| Thickness t (μm) | 10 | 5 | 5 | 12 |
| Length of battery L (mm) | 10 | 10 | 10 | — |
| Thickness of current collector T (μm) | 10 | 10 | 10 | 5 |
| Thickness of current collector T' (μm) | 15 | 15 | 15 | 7.5 |
| Energy density (Wh/L) | 767 | 824 | 854 | 870 |
| Facing area per 1 cm³ (cm²) | 141 | 143 | 72 | 47 |
| Positive electrode: 3.75 V, 195 mAh/g | Positive electrode active material: 55% by volume | | | : 75% by volume |
| Negative electrode: 0.1 V, 360 mAh/g | Negative electrode active material: 70% by volume | | | : 74% by volume |

Example 4

A secondary battery having a configuration shown in FIG. 2 was fabricated. As a positive electrode active material, $LiNi_{1/3}Co_{1/3}Mn_{1/3}O_2$ (NCM) was used, and an ultra-thick-film positive electrode which was in electron contact with a positive electrode current collector foil and which was provided with spaces for receiving a first active material fluid was produced. The positive electrode active material was formed into a structure which was covered with a conductive material and a binder in a network shape. The average particle size of the positive electrode active material was 20 μm in diameter, the thickness of the positive electrode active material was 100 μm, and the porosity of the electrode was 40% by volume. By immersing the positive electrode structure together with the current collector in an organic solvent solution of a PVdF-HFP copolymer (solid content: 5% by mass), surfaces were dip-coated with the solution, followed by drying. Thereby, a dense separating membrane composed of the PVdF-HFP copolymer was formed. The thickness of the separating membrane was 3 μm. A negative electrode slurry was prepared by mixing particulate lithium titanate (LTO) having an average particle size of 0.2 μm and acetylene black (AB) having an average particle size of 0.05 μm into a nonaqueous electrolyte, and the vacant spaces of the positive electrode were filled with the slurry. The nonaqueous electrolyte used was prepared by mixing ethylene carbonate (EC) containing 1 M $LiPF_6$, ethylene carbonate (EC), dimethyl carbonate (DMC), and ethyl methyl carbonate (EMC) at a volume ratio of 3:4:3. The volume ratio of LTO/AB/electrolyte was 55:5:40. Part of the electrolyte caused the separating membrane to swell, thereby forming an ion conductive membrane.

It is to be understood that the present disclosure is not limited to the examples described above, and various modifications to the embodiments are possible within the technical scope of the present disclosure.

The present application is based upon and claims the benefit of priority from Japanese Patent Application No. 2016-210562, filed Oct. 27, 2016, the entire contents of which are incorporated herein by reference.

INDUSTRIAL APPLICABILITY

The secondary battery disclosed in the present description is applicable to the battery industry field.

REFERENCE SIGNS LIST 10, 10B, 10C, 110 secondary battery, 11, 111 first current collector, 12 collector terminal, 13 first active material fluid, 14 first electrode, 15 second current collector, 16 structure, 17 separating membrane, second electrode, 19 filling hole, 20 battery case, partition, 22 bottom, 23 bottomed hole, 25 space, 111 first current collector, 113 first active material layer, 114 first electrode, 115 second current collector, 116 second active material layer, 117 separator, 118 second electrode

The invention claimed is:

1. A secondary battery comprising:
a first electrode;
a first active material fluid in the form of a slurry and which is electrically connected to the first electrode, contains a first active material and a supporting salt, and is flowable; and
a second electrode including a structure which is formed by containing a second active material, the structure either being immersed in the first active material fluid or holding the first active material fluid, and a separating membrane disposed between the first active material fluid and the structure, the separating membrane having ion conducting properties and insulating properties.

2. The secondary battery according to claim 1, wherein the second electrode is the structure provided with a plurality of bottomed holes, and the first active material fluid is held in the bottomed holes.

3. The secondary battery according to claim 2, wherein the second electrode is provided with the bottomed holes having a rectangular cross section.

4. The secondary battery according to claim 2, wherein the second electrode is provided with filling holes at a bottom of the bottomed holes, the filling holes being used for filling the first active material fluid.

5. The secondary battery according to claim 2, wherein the first electrode includes collector terminals to be inserted into openings of the bottomed holes.

6. The secondary battery according to claim 1, wherein the second electrode includes the structure which is formed into a predetermined shape in a state where second active material portions are electrically connected to one another, and the structure is immersed in the first active material fluid.

7. The secondary battery according to claim 6, wherein the second electrode is provided with a space for receiving the first active material fluid.

8. The secondary battery according to claim 1, wherein the first electrode is a positive electrode; the first active material fluid contains a positive electrode active material as the first active material, and a conductive material; and the second electrode is a negative electrode.

9. The secondary battery according to claim 1, wherein the first electrode is a negative electrode; the first active material fluid contains a negative electrode active material as the first active material; the second electrode is a positive electrode; and the structure further contains a conductive material.

10. The secondary battery according to claim 1, wherein the first active material fluid includes a lithium-containing supporting salt and a nonaqueous electrolyte, and the separating membrane conducts lithium ions.

* * * * *